United States Patent
Xie

(10) Patent No.: US 12,327,365 B2
(45) Date of Patent: Jun. 10, 2025

(54) STEREO MATCHING METHOD, IMAGE PROCESSING CHIP AND MOBILE VEHICLE

(71) Applicant: AUTEL ROBOTICS CO., LTD., Guangdong (CN)

(72) Inventor: Qingqing Xie, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 609 days.

(21) Appl. No.: 17/587,121

(22) Filed: Jan. 28, 2022

(65) Prior Publication Data

US 2022/0156954 A1    May 19, 2022

Related U.S. Application Data

(63) Continuation of application No. PCT/CN2020/104892, filed on Jul. 27, 2020.

(30) Foreign Application Priority Data

Jul. 31, 2019   (CN) .................... 201910702668.3

(51) Int. Cl.
    G06T 7/40     (2017.01)
    G06T 7/33     (2017.01)
    G06T 7/593    (2017.01)

(52) U.S. Cl.
    CPC ........... *G06T 7/40* (2013.01); *G06T 7/337* (2017.01); *G06T 7/593* (2017.01)

(58) Field of Classification Search
    CPC  G06T 7/40; G06T 7/337; G06T 7/593; G06T 2207/10021; G06T 2207/10032;
    (Continued)

(56) References Cited

U.S. PATENT DOCUMENTS

2015/0221098 A1* 8/2015 Uemori ............... G06T 7/30
                                                      382/154
2015/0256819 A1* 9/2015 Panahpour Tehrani ..................
                                                   H04N 19/503
                                                      345/420

(Continued)

FOREIGN PATENT DOCUMENTS

CN    103226821 A    7/2013
CN    104867135 A    8/2015
(Continued)

OTHER PUBLICATIONS

PCT International Search Report mailed Nov. 2, 2020; PCT/CN2020/104892.

*Primary Examiner* — Tom Y Lu
*Assistant Examiner* — Pardis Sohraby
(74) *Attorney, Agent, or Firm* — Frank Gao, Esq.

(57) ABSTRACT

Embodiments of the present invention relates to a stereo matching method, an image processing chip and a mobile vehicle. The stereo matching method includes: calculating aggregate cost values between all reference pixels and a target pixel in a preset search region, the reference pixel being a pixel in a reference image, and the target pixel being a pixel in a target image; determining a texture property of the reference image in the search region according to a distribution of the aggregate cost values; and using a method for calculating a disparity value corresponding to the texture property, to obtain a disparity value between the reference image and the target image at a position of the target pixel. In the method, advanced information is mined from an image, and a manner or policy of calculating a disparity is adaptively adjusted according to a distribution of aggregate cost values in a search region, to exclude the influence of a repeated texture region or a texture-less region as much as (Continued)

possible, so that the robustness of calculating the disparity is significantly improved.

15 Claims, 5 Drawing Sheets

(58) Field of Classification Search
CPC ..... B64U 10/10; B64U 2101/00; G06F 18/22; G06V 10/751; G06V 20/13
USPC .......................................................... 382/103
See application file for complete search history.

(56) References Cited

U.S. PATENT DOCUMENTS

| | | | | |
|---|---|---|---|---|
| 2015/0269736 A1* | 9/2015 | Hannuksela | ......... | H04N 13/395 |
| | | | | 345/419 |
| 2015/0279045 A1* | 10/2015 | Zhong | .................. | G06V 20/582 |
| | | | | 382/154 |
| 2018/0211400 A1 | 7/2018 | Park et al. | | |
| 2018/0350087 A1* | 12/2018 | Kowdle | .................. | G06T 7/337 |
| 2019/0087971 A1* | 3/2019 | Sano | .......................... | G06T 7/85 |
| 2019/0156502 A1* | 5/2019 | Lee | ............................. | G06T 7/11 |
| 2019/0362515 A1* | 11/2019 | Ciurea | ................. | H04N 13/243 |

FOREIGN PATENT DOCUMENTS

| | | |
|---|---|---|
| CN | 105551035 A | 5/2016 |
| CN | 106815594 A | 6/2017 |
| CN | 107316326 A | 11/2017 |
| CN | 107392950 A | 11/2017 |
| CN | 107564044 A | 1/2018 |
| CN | 108460792 A | 8/2018 |
| CN | 108629763 A | 10/2018 |
| CN | 109544622 A | 3/2019 |
| CN | 109658443 A | 4/2019 |
| CN | 109978928 A | 7/2019 |
| CN | 110443186 A | 11/2019 |

* cited by examiner

STEREO MATCHING METHOD, IMAGE PROCESSING CHIP AND MOBILE VEHICLE

CROSS-REFERENCE TO RELATED APPLICATIONS

The present application is a continuation of International Application No. PCT/CN2020/104892, filed on Jul. 27, 2020, which claims priority to Chinese patent application No. 201910702668.3, filed on Jul. 31, 2019, which is incorporated herein by reference in its entirety.

TECHNICAL FIELD

The present application relates to the field of image processing technologies, and in particular, to a stereo matching method, an image processing chip and a mobile vehicle.

BACKGROUND

A task of stereo matching is to find correspondences between pixels of different image information obtained under different viewing angles. Based on the known correspondences, disparity information may be easily obtained by using a principle of binocular stereo vision, to help subsequently further obtain depth information and stereo information of an original image. As a basis for subsequent processing of stereo vision, how to efficiently and accurately complete the task of the stereo matching is always the most important and key problem in a stereo vision technology.

However, limited by an object itself and the complexity of a shooting scenario, many different influencing factors (optical distortion, specular reflection on a smooth surface, perspective distortion or an overlapping and discontinuous object) generate, which cause significant influence on a matching result of the stereo matching.

For example, for some low-texture regions that lack significance and repeated texture regions with a high texture repetition degree, mismatching is very easily caused, causing that corresponding points seriously deviate during solution and wrong disparity values are generated. After the wrong disparity values are applied to subsequent calculation of the stereo vision, distances from obstacles may be estimated wrongly to cause influence such as path planning.

Therefore, how to effectively exclude the influencing factors and obtain a stereo matching result with enough high accuracy and reliability is a problem to be urgently resolved.

SUMMARY

To resolve the foregoing technical problem, embodiments of the present invention provide a stereo matching method, an image processing chip and a mobile vehicle, to exclude factors influencing texture distribution characteristics.

To resolve the foregoing technical problem, the embodiments of the present invention provide the following technical solutions. A stereo matching method is provided, including:
calculating aggregate cost values between all reference pixels and a target pixel in a preset search region, the reference pixel being a pixel in a reference image, and the target pixel being a pixel in a target image; determining a texture property of the reference image in the search region according to a distribution of the aggregate cost values; and using a method for calculating a disparity value corresponding to the texture property, to obtain a disparity value between the reference image and the target image at a position of the target pixel.

Optionally, the texture property includes: a normal region, a repeated texture region and a texture-less region.

Optionally, the determining a texture property of the reference image in the search region according to a distribution of the aggregate cost values includes:
counting low-cost pixels in a low aggregation cost interval in which the aggregate cost values are located, the low aggregation cost interval being defined by a lowest value among the aggregate cost values;
calculating a proportion of the low-cost pixels in the reference pixels in the search region; and determining that the texture property is a texture-less region, when the proportion is greater than a preset proportion threshold.

Optionally, when the texture property is the texture-less region, the using a method for calculating a disparity value corresponding to the texture property, to obtain a disparity value between the reference image and the target image at a position of the target pixel includes: setting the disparity value at the position of the target pixel to an invalid value.

Optionally, the determining a texture property of the reference image in the search region according to a distribution of the aggregate cost values includes:
determining whether low-cost pixels in a low aggregation cost interval in which the aggregate cost values are located are unique, the low aggregation cost interval being defined by a lowest value among the aggregate cost values; and determining the texture property is the normal region if yes.

Optionally, when the texture property is the normal region, the using a method for calculating a disparity value corresponding to the texture property, to obtain a disparity value between the reference image and the target image at a position of the target pixel includes:
determining that a reference pixel with a lowest aggregate cost value is a corresponding pixel of the target pixel in the reference image; and
using a distance between the corresponding pixel and the target pixel as the disparity value.

Optionally, the determining a texture property of the reference image in the search region according to a distribution of the aggregate cost values of all the pixels includes:
counting low-cost pixels in a low aggregation cost interval in which the aggregate cost values are located, the low aggregation cost interval being defined by a lowest value among the aggregate cost values;
calculating a proportion of the low-cost pixels in the reference pixels in the search region; and
determining that the texture property is a repeated texture region, when the proportion is less than a preset proportion threshold and a quantity of the low-cost pixels is greater than a preset quantity threshold.

Optionally, when the texture property is the repeated texture region, the using a method for calculating a disparity value corresponding to the texture property, to obtain a disparity value between the reference image and the target image at a position of the target pixel includes:
updating a size of the search region according to a distribution width of the low-cost pixels; and
recalculating aggregate cost values between all reference pixels and a target pixel in the updated search region.

Optionally, the updating the search region according to a distribution width of the low-cost pixels includes: in the reference image, calculating a distance between a low-cost pixel at a maximum horizontal coordinate and a low-cost pixel at a minimum horizontal coordinate; and using the distance as a length of the updated search region.

Optionally, a lower limit of the low aggregation cost interval is the lowest value among the aggregate cost values, and an upper limit of the low aggregation cost interval is 1.5 times of the lowest value among the aggregate cost values.

Optionally, when the texture property is a normal region, the method further includes: performing, by quadratic curve fitting, subpixel refinement on the disparity value at the position of the target pixel.

Optionally, the performing, by quadratic curve fitting, subpixel refinement on the disparity value at the position of the target pixel includes:
  determining a reference pixel with a lowest aggregate cost value as an optimal pixel; using an aggregate cost value of the optimal pixel and aggregate cost values of two reference pixels adjacent to the optimal pixel in the reference image to fit a quadratic curve; and using a horizontal coordinate corresponding to a minimum point of the quadratic curve obtained through fitting as a refined disparity value.

Optionally, the calculating aggregate cost values between all reference pixels and a target pixel in a preset search region includes:
  performing grayscale value sampling in the target image by using a first sampling window with a preset side length, to obtain a first sampling result, a center of the first sampling window being the target pixel;
  performing grayscale value sampling in the reference image by using a second sampling window with the same size as the first sampling window, to obtain a second sampling result, a center of the second sampling window being the reference pixel;
  calculating a difference between grayscale values of the first sampling result and the second sampling result at corresponding positions; and
  superposing differences between all the grayscale values, to obtain an aggregate cost value of the reference pixels.

Optionally, the target image is in epipolar alignment with the reference image, and the preset search region is a region between a search lower limit pixel and a search upper limit pixel;
  two-dimensional coordinates of the search lower limit pixel in the reference image are $(x_0+k_1, y_0)$, and two-dimensional coordinates of the search upper limit pixel in the reference image are $(x_0+k_2, y_0)$; and two-dimensional coordinates of the target pixel in the target image are $(x_0, y_0)$, and $k_1$ and $k_2$ are constant values greater than 0.

Another embodiment of the present invention provides the following technical solutions: An image processing chip is provided, including: a processor and a memory communicatively connected to the processor,
  the memory storing computer-executable program instructions, the computer-executable program instructions, when invoked, causing the processor to perform the stereo matching method described above, to obtain a disparity space image.

Still another embodiment of the present invention provides the following technical solutions: A mobile vehicle is provided,
  including: at least a pair of cameras, configured to capture first image information and second image information respectively; and an image processing chip, configured to: receive the first image information and the second image information, apply the stereo matching method described above to obtain a corresponding disparity map, and convert the disparity space image into corresponding depth information according to internal parameters and external parameters of the cameras.

Optionally, optical axes of the pair of cameras are parallel, and the first image information and the second image information that are captured are image information with epipolar alignment.

Compared with the prior art, in the stereo matching method provided in the embodiments of the present invention, advanced information is mined from an image, and a manner or policy of calculating a disparity value is adaptively adjusted according to a distribution of aggregate cost values in a search region, to exclude the influence of a repeated texture region or a texture-less region as much as possible, so that the robustness of calculating the disparity is significantly improved.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in this specification are the same as that generally understood by a person skilled in the technical field to which the present invention belongs. In this specification, terms used in the specification of the present invention are merely intended to describe objectives of the specific embodiments, but are not intended to limit the present invention. A term "and/or" used in this specification includes any or all combinations of one or more related listed items.

In addition, technical features involved in different embodiments of the present invention described below may be combined together if there is no conflict.

Stereo matching is a process of finding matched pixels from images at different viewpoints. Specifically, assuming that projection points of any point M of a spatial scenery on imaging planes of two (or more than two) cameras are ml and mr, ml and mr are referred to as corresponding points. A process of finding corresponding points between imaging planes of the two cameras is stereo matching.

Figure 1:
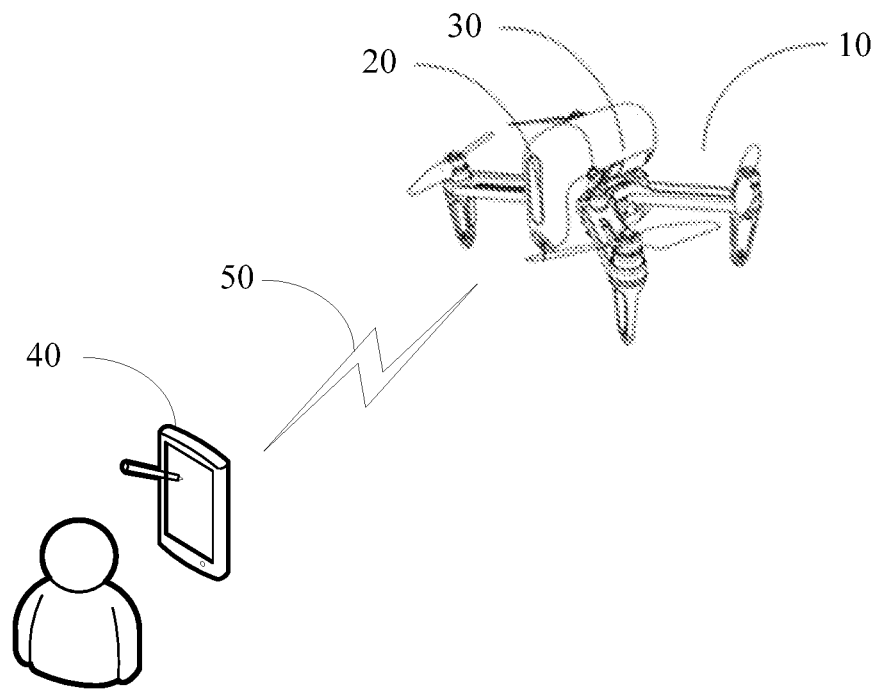
FIG. 1 is a schematic diagram of an application environment according to an embodiment of the present invention.

Based on a matching relationship of the corresponding pixels, disparity information may be obtained to help reconstruct three-dimensional (3D) information of images. The 3D information has an important practical application value, and may be used in many different scenarios. For example, the 3D information assists an unmanned aerial vehicle (UAV) or an intelligent driving vehicle in determining a distance from an object. FIG. 1 shows an application environment of a stereo vision technology based on stereo matching according to an embodiment of the present invention.

As shown in FIG. 1, the application environment includes a mobile vehicle 10, an image capture device 20 disposed on the mobile vehicle, an image processing chip 30, a user terminal 40 and a wireless network 50.

The mobile vehicle 10 may be any type of a loading platform that is moveable freely under power, including but not limited to, an aerial vehicle, a surface vehicle or a ground vehicle. The mobile vehicle 10 may have a corresponding volume or power according to an actual requirement, to provide a loading capacity, a speed and a mileage that can meet a use requirement. As a loading platform having driving power, one or more devices may be further mounted in the mobile vehicle 10, to implement corresponding functions.

In this embodiment, an example in which the mobile vehicle 10 is a UAV is used. The UAV 10 may include a body, an arm connected to the body and a power apparatus disposed on the arm. The arm may be fixedly connected to or integrally formed with the body, or may be folded relative to the body. The power apparatus includes a motor and a propeller connected to the motor, and rotation of a motor shaft of the motor drives the propeller to rotate to provide a pulling force required for the UAV to fly.

The image capture device 20 is a device carried on the mobile vehicle 10, and is configured to capture image information and photograph pictures or videos. The image capture device 20 may include an optical system, a photosensitive element and at least one storage component. The optical system is configured to determine or adjust image photographing parameters such as a focal length, a field of view (FOV) and an aperture, and project corresponding light onto the photosensitive element. The photosensitive element may be an electronic photosensitive device, such as a charge coupled device (CCD) or a complementary metal-oxide-semiconductor transistor (CMOS), and is configured to convert optical information into an electric signal, and record and store the electric signal in the storage component to implement image information capture.

In this embodiment, an example in which the image capture devices 20 are cameras disposed in pairs is used. The cameras are respectively disposed on two sides of the mobile vehicle, have parallel optical axes, and may capture image information (that is, first image information and second image information) of a same space object under different viewing angles as basic data of computer stereo vision.

In some embodiments, to improve the image quality of the image capture device 20 and the use flexibility, the image capture device 20 may be further carried and fixed on the mobile vehicle 10 through a pan tilt or a similar shake elimination apparatus, to allow a lens of the image capture device 20 to be rotatable around at least one axis relative to the UAV 10.

The user terminal 40 is a terminal device configured to receive a user operation instruction, display image information to a user, and interact with the user. The terminal device may include a display configured to display image information to the user, an input device (such as an input key or a touchscreen) configured to receive a user instruction, and an output device (such as a speaker).

The wireless network 50 may be any type of a radio frequency communication network (such as a 2.4 GHz radio frequency network), and is configured to provide a wireless communication channel to support a communication connection and data interaction between the user terminal 40 and the image capture device 20 or the mobile vehicle 10. The user terminal 40, the image capture device 20 or the mobile vehicle 10 may be provided with a communication module matching the wireless network 50, to join the wireless network 50 through the communication module.

The image processing chip 30 may be an integrated circuit having any suitable package form and size. As a complete system-on-chip, the integrated circuit may have one or more different functional circuit modules. The functional circuit modules may independently implement one or more processing steps or cooperate with each other to perform a complete image processing process.

Figure 2:
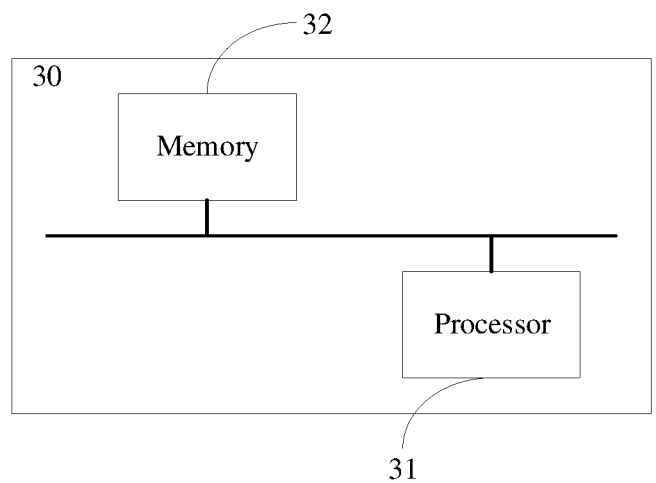
FIG. 2 is a structural block diagram of an image processing chip according to an embodiment of the present invention.

FIG. 2 is a structural block diagram of an image processing chip 30 according to an embodiment of the present invention. As shown in FIG. 2, a main control system may include a processor 31 and a memory 32. The processor 31 and the memory 32 are communicatively connected to each other through a bus.

The processor 31 may be any type of on-chip circuit with one or more processing cores, may perform single-threaded or multi-threaded operations, and is configured to analyze instructions to perform operations such as obtaining data, performing logical operation functions, and delivering operation processing results. The processor 31 has several data interfaces, and may be configured to form a data input end or output end.

The memory 32 is used as a non-volatile computer-readable storage medium, such as at least one magnetic disk storage device, a flash memory, a distributed storage device remotely disposed relative to the processor 31 or another non-volatile solid-state storage device.

The memory 32 may have a program storage region used for storing a non-volatile software program, a non-volatile computer-executable program and a module to be invoked by the processor 31 to enable the processor 31 to perform one or more method steps. The memory 32 may further have a data storage region used for storing the operation processing result delivered and outputted by the processor 32.

In this embodiment, the image processing chip 30 may write suitable computer-executable program instructions into the memory 32 shown in FIG. 2, and the processor 31, when invoking the computer-executable program instructions, performs stereo matching method on the first image information and the second image information, to obtain disparity data. In addition, with further reference to internal parameters and external parameters of the camera, and disparity information is converted into depth information, to provide one or more intelligent functions such as path planning and obstacle avoidance warning to the UAV.

Specifically, disparity data may be represented in the form of a disparity map. The disparity map is an image having the same size as a reference image and an element value as a disparity value. A principle of obtaining the disparity map is to map a calculated disparity value to a corresponding grayscale space 0 to 255.

In the application scenario shown in FIG. 1, there may be many influencing factors that may adversely interfere with a stereo matching result. Typically, when sampling regions of the first image information and the second image information belong to texture-less regions or repeated texture regions, it is difficult for the image capture chip to identify or distinguish the regions, and a problem of a disparity calculation error or crash is likely to occur.

Figure 3:
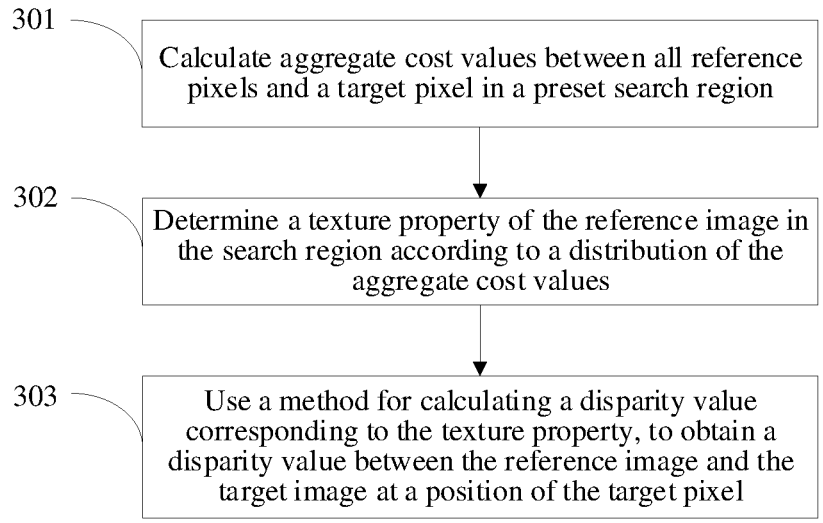
FIG. 3 is a method flowchart of a stereo matching method according to an embodiment of the present invention.

By applying the stereo matching method provided in the embodiments of the present invention and using advanced information of image information obtained through mining, the influence of a texture property can be well improved or avoided, and the robustness of a disparity solution can be improved. FIG. 3 shows a stereo matching method according to an embodiment of the present invention. A task of stereo matching shown in FIG. 3 is to find a corresponding point of a target pixel in a reference image, and calculate a disparity between the two based on this.

As shown in FIG. 3, the stereo matching method includes the following steps:

301. Calculate aggregate cost values between all reference pixels and a target pixel in a preset search region.

The reference pixel is a pixel in a reference image, and the target pixel is a pixel in a target image.

As described above, the stereo matching is a process of matching between image information at two different viewpoints. In this embodiment, "target image" represents a reference image for the stereo matching, and "reference image" represents image information of an object in the same space as that of the target image at another viewpoint.

Specifically, the target image and the reference image may be image data of any type or format, provided that the target image and the reference image are at different viewpoints. For example, a left JPG image of a scenario is photographed by a left-side camera and a right JPG image of the scenario is photographed by a right-side camera. In some embodiments, the target image and the reference image may alternatively be interchangeable. The target image is only used for representing a role on which the determining is based.

"Aggregate cost value" is a parameter used for measuring a similarity between the target pixel and the reference pixel. The aggregate cost value may be specifically calculated by using any type of function, model or algorithm according to an actual situation.

For example, for traditional photogrammetry, aggregate cost values of two pixels may be calculated by using methods such as a grayscale absolute difference (AD), a grayscale sum of absolute differences (SAD) and a normalized correlation coefficient (NCC).

In computer vision, a mutual information (MI) method, a census transform (CT) method, a rank transform (RT) method, a Birchfield and Tomasi (BT) method and the like may be used.

It should be noted that, different algorithms for calculating the aggregate cost value have respective features, and have incomplete identical performances for different types of data. A person skilled in the art may select a suitable method for calculating an aggregate cost value according to a requirement of an actual situation or a design requirement.

Figure 4:
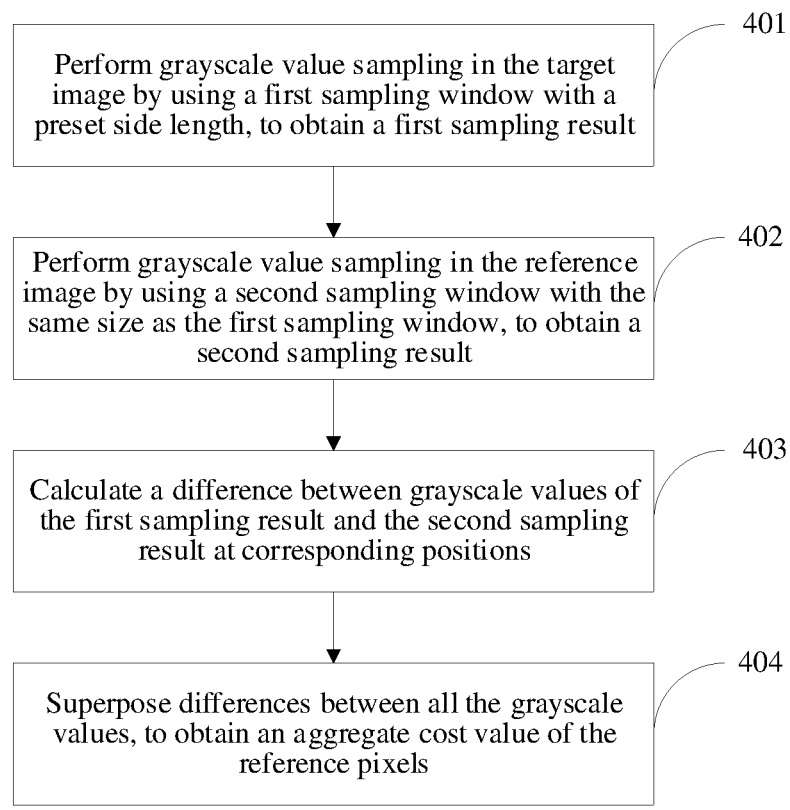
FIG. 4 is a method flowchart of a method for calculating an aggregate cost value according to an embodiment of the present invention.

Specifically, the method for calculating the aggregate cost value based on a grayscale value comparison between the sampling regions shown in FIG. 4 may be used for calculation.

401. Perform grayscale value sampling in the target image by using a first sampling window with a preset side length, to obtain a first sampling result.

A center of the first sampling window is the target pixel. A specific size may be set by a technician according to an actual situation, for example, may be a region with a size of (2n+1)*(2n+1), and n is a positive integer.

The grayscale value sampling refers to obtaining a grayscale value in each pixel position in a sampling window. For example, when a 3*3 sampling window is used, a 3*3 grayscale value matrix A shown in FIG. 7 may be obtained.

402. Perform grayscale value sampling in the reference image by using a second sampling window with the same size as the first sampling window, to obtain a second sampling result.

A center of the second sampling window is the reference pixel. The second sampling window is a sampling window having the same size as the first sampling window, and "first" and "second" are only used for indicating that the two are executed in different image information. Similarly, after the second sampling window is also sampled, a 3*3 grayscale value matrix B shown in FIG. 7 may be obtained.

403. Calculate a difference between grayscale values of the first sampling result and the second sampling result at corresponding positions.

Figure 6:
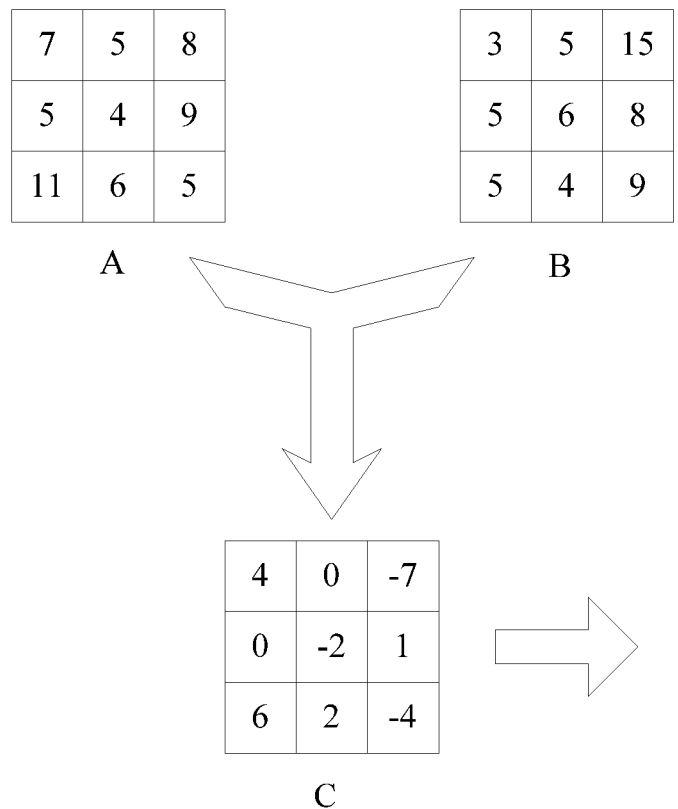
FIG. 6 is a schematic diagram of a method for calculating an aggregate cost value of a selected reference pixel according to an embodiment of the present invention.

When a sampling window with the same size is sampled, as shown in FIG. 6, two grayscale value matrices A and B may be obtained, and matrix subtraction may be performed accordingly, to obtain differences between grayscale values in corresponding positions, and to form a matrix C with the same size later.

404. Superpose differences between all the grayscale values, to obtain an aggregate cost value of the reference pixels.

It may be understood that, the differences between the grayscale values may be positive values or negative values. To correctly represent the aggregate cost value, absolute values of the differences may be taken, to obtain corresponding difference values. The aggregate cost value of the reference pixels (26 shown in FIG. 6) may be obtained by simply superimposing the differences.

"Search region" refers to a search interval delimited in a reference image according to a position of a target pixel. The search interval includes a reference pixel corresponding to the target pixel. The search region may be specifically set to a corresponding form according to a requirement of an actual situation.

For example, when optical axes of cameras that capture the reference image and the target image are parallel, a corresponding model is a parallel stereo vision model, and epipolar lines between the two are aligned. In this way, a disparity vector between two pixels is parallel to a horizontal scanning line of the image, and is actually degenerated into a scalar, and a corresponding pixel may be searched on a same line.

In this case, the preset search region may be positioned as a region between a search lower limit pixel and a search upper limit pixel.

two-dimensional coordinates of the search lower limit pixel in the reference image are $(x_0+k_1, y_0)$, and two-dimensional coordinates of the search upper limit pixel in the reference image are $(x_0+k_2, y_0)$; and two-dimensional coordinates of the target pixel in the target image are $(x_0, y_0)$, and $k_1$ and $k_2$ are constant values greater than 0.

302. Determine a texture property of the reference image in the search region according to a distribution of the aggregate cost values.

Conventionally, a search region of a suitable size is selected for search in a reference image during stereo matching, and an optimal reference pixel is determined as a corresponding point. Therefore, statistics on a distribution or distribution rule of the aggregate cost value of each reference pixel determined in the search region is collected, to effectively mine advanced information of the current search region.

The distribution of the aggregate cost values refers to a data statistical result of an aggregate cost value of each reference pixel in the search region. The distribution may be represented by using a specific statistical icon, a statistical model or other suitable manners. For example, a histogram shown in FIG. 7 may be used to visually indicate that the distribution of the aggregate cost values in the search region is relatively average.

"Texture" refers to a feature with an identifiability in image information. In the computer vision, the texture is of great significance. As recorded above, there are several special texture setting situations in the image information, which may significantly influence and interfere with the stereo matching.

Figure 8:
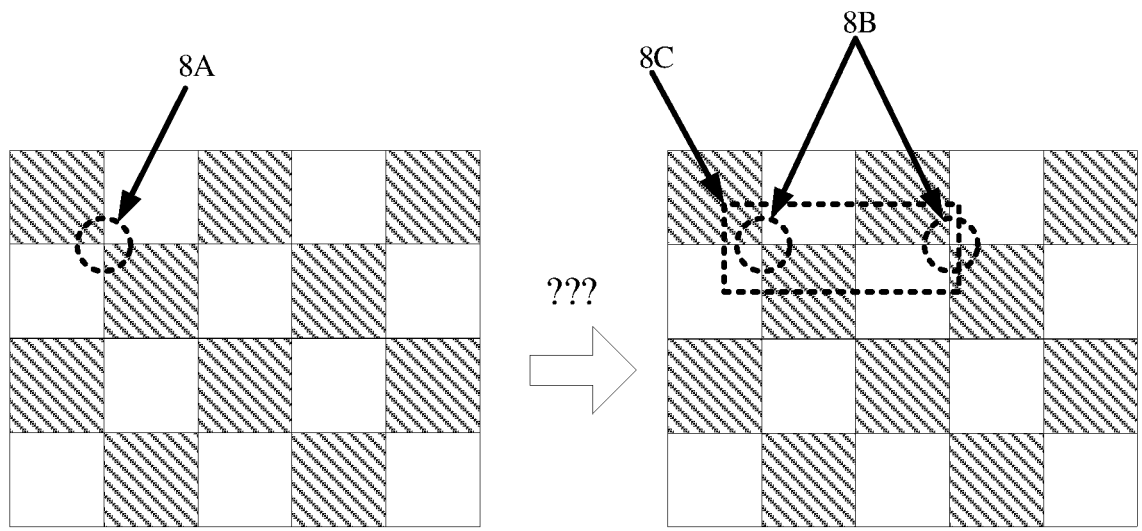
FIG. 8 is a schematic diagram of a repeated texture region according to an embodiment of the present invention.

For example, when there is checkerboard image information similar to that shown in FIG. 8 in image information, it is difficult for the stereo matching to recognize the corresponding pixel globally.

In this embodiment, such a term "texture property" represents a texture of the reference image in a current search range. A specific texture property may be delimited or classified according to a standard set by a technician according to an actual situation, provided that the commonality of the influence of the texture in the search region on the stereo matching can be reflected to some extent.

In some embodiments, the texture property may include three types: normal region, repeated texture region, and texture-less region, which are respectively used for representing differences in influence on the stereo matching.

"Repeated texture region" indicates that there are a plurality of highly similar textures in a region. That is, a plurality of similar textures overlap each other, for example, a region 8A and a region 8B shown in FIG. 8. In terms of a computer, it is difficulty to have a global field of view to accurately find which region in 9B specifically corresponding to that in 8A during stereo matching.

"Texture-less region" indicates that there is no significant grayscale difference change in a region. That is, a texture is not obvious. For example, on a wooden table surface with a smooth and continuous surface shown in FIG. 9, it is difficult for the computer to distinguish a specific difference between a plurality of regions in 9B. Therefore, a point corresponding to that in 9A cannot be reliably determined according to the texture during stereo matching, and there is also relatively significant interference.

"Normal region" is a region that is different from the repeated texture region and the texture-less region, and does not cause significant interference or influence on the stereo matching. In actual operation, the normal region may be defined by using an operation of an exclusion method. That is, after it is determined that a region does not belong to the repeated texture region and the texture-less region, the region may be classified as the normal region.

303. Use a method for calculating a disparity value corresponding to the texture property, to obtain a disparity value between the reference image and the target image at a position of the target pixel.

A technician may be targeted to set or adjust the method for calculating the disparity value according to different texture properties to implement the self-adaptive adjustment process of step 303. The specific method for calculating the disparity value is related to the texture property determined by using the setting, and may be set according to a requirement of an actual situation.

"Disparity value" is a distance change between the target pixel and the corresponding reference pixel in the reference image. The disparity value may be used for reflecting depth information of an image based on a principle of binocular vision.

The foregoing steps are repeatedly performed for many times, and after the filling of a disparity value corresponding to each target pixel in the target image is completed, a disparity map with a corresponding size may be obtained to complete a task of the stereo matching.

In the stereo matching method provided in the embodiments of the present invention, during searching, texture properties of search regions are distinguished by mining and using a distribution of aggregate cost values, and a manner of calculating a disparity value is adaptively adjusted according to the texture properties of the search regions, thereby effectively avoiding the influence of textures on stereo matching, and improving the robustness of the stereo matching.

It should be noted that, based on the inventive idea disclosed in the embodiments of the present invention, that is, analyzing the distribution of the aggregate cost values to adaptively adjust the method for calculating the disparity value, a person skilled in the art may further correspondingly adjust, replace, integrate or change the technical solutions in the embodiments of the present invention according to a requirement of an actual situation or a different design purpose, to avoid repeated description and the description is not listed. All such changes to the embodiments of the present invention fall within the scope of the present invention.

Figure 5:
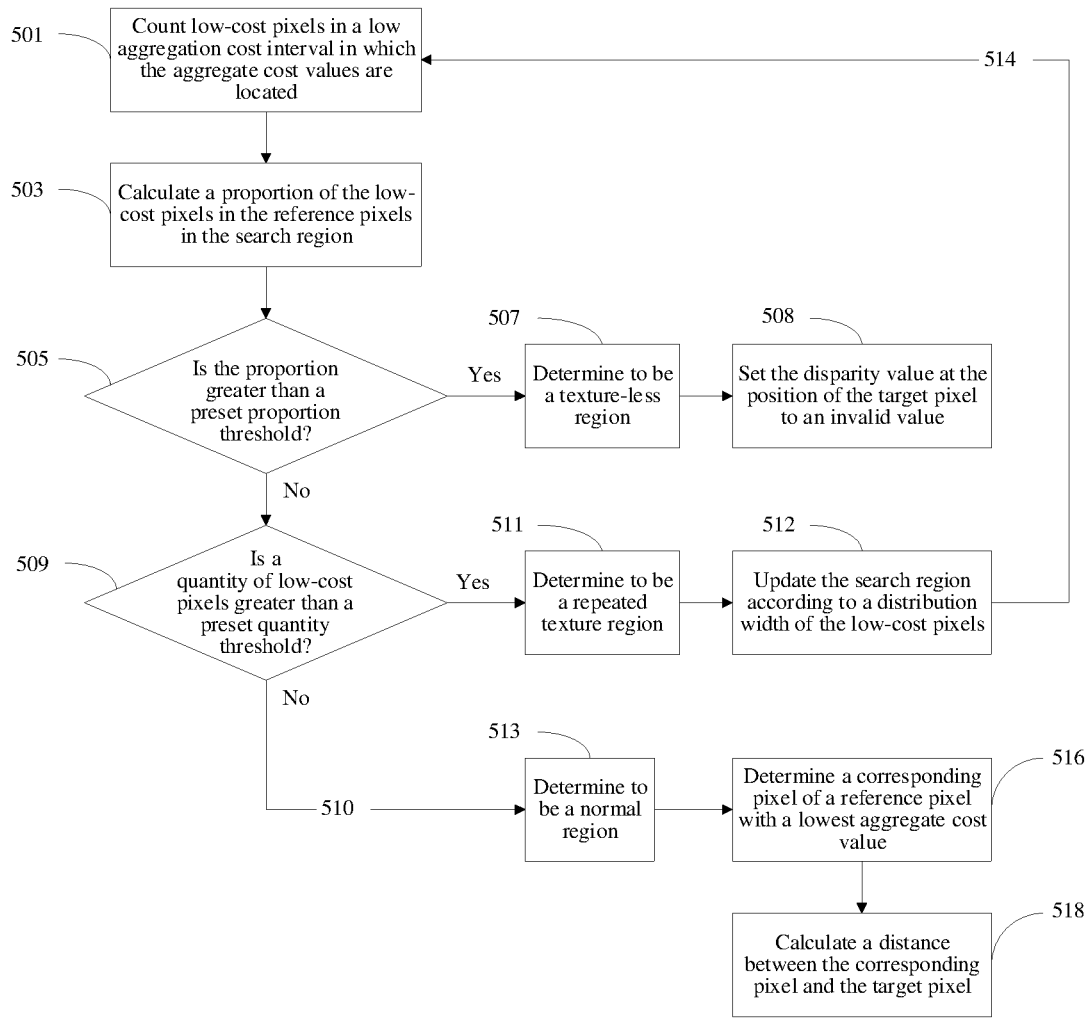
FIG. 5 is a method flowchart of a method for calculating a disparity value according to an embodiment of the present invention.

Based on the foregoing manner of dividing the normal region, the repeated texture region and the texture-less region, the embodiments of the present invention further provide a stereo matching method shown in FIG. 5, to specifically describe in detail how to determine the texture property and adaptively adjust the method for calculating the disparity value.

After the aggregate cost value corresponding to each reference pixel in the entire search region is calculated, as shown in FIG. 5, the stereo matching method includes the following steps:

501. Count low-cost pixels in a low aggregation cost interval in which the aggregate cost values are located.

The low aggregation cost interval is a value range with specific size defined by a lowest value among the aggregate cost values.

Specifically, a lower limit of the low aggregation cost interval is the lowest value among the aggregate cost values, and an upper limit of the low aggregation cost interval is 1.5 times of the lowest value among the aggregate cost values. That is, all reference pixels located in a range of 1.5 times of the lowest value among the aggregate cost values are used as low-cost pixels.

The lowest value among the aggregate cost values is a minimum value among aggregate cost values corresponding to all the reference pixels in the search region. In this embodiment, a smaller aggregate cost value may indicate that the reference pixel is more similar to the target pixel, and is a better selection as the corresponding point. "Low-cost pixel" indicates that the aggregate cost value belongs to the reference pixel within the low aggregation cost interval.

503. Calculate a proportion of the low-cost pixels in the reference pixels in the search region.

A proportion occupied by the low-cost pixels indicates whether a reference pixel with a lowest value in the search region is prominent, or whether there is a more significant certainty to determine a unique reference pixel as the corresponding point of the target pixel when screening is performed according to the aggregate cost values.

505. Determine whether the proportion is greater than a preset proportion threshold, and if yes, perform step 507; or if not, perform step 509.

The proportion threshold is an empirical value, and may be set or determined by a technician according to an actual situation or a large amount of experimental data. For example, the proportion threshold may be set to one third.

507. Determine that the texture property is a texture-less region.

Figure 9:
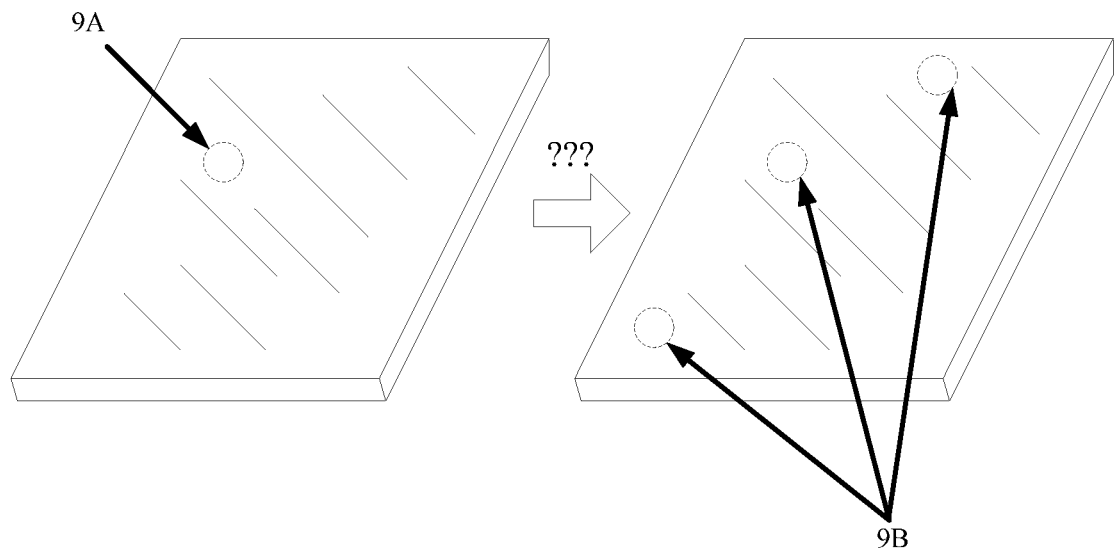
FIG. 9 is a schematic diagram of a texture-less region according to an embodiment of the present invention.

Referring to FIG. 9 still, it can be seen that when a texture in a search region is not obvious, a discrimination between pixels is relatively low. Therefore, a calculated aggregate cost value is also relatively close.

In this way, when a proportion of the low-cost pixels is excessively high, it may indicate that a large quantity of pixels is aggregated in a relatively narrow range, and it may be considered with certainty that the range belongs to a texture-less region.

509. Determine whether a quantity of the low-cost pixels is greater than a preset quantity threshold. If yes, perform step 511; or if not, perform step 513.

The quantity threshold is also an empirical value, is similar to the proportion threshold, and may also be set or determined according to an actual situation, experimental data or statistical analysis of big data.

511. Determine that the texture property is a repeated texture region.

Different from a relative quantity reflected by a comparison result of the proportion threshold, a quantity of the low-cost pixels reflects an absolute quantity. Referring to FIG. 8 still, when a region has a repeated texture, a part of pixels with similar feature information (for example, two regions indicated by 8B in FIG. 8) inevitably exists. Similarly, aggregate cost values obtained by calculating the part of the pixels are also similar.

Therefore, when it is found that a quantity of low-cost pixels exceeds a specific limit, and it indicates that features of a part of pixels that cannot be ignored are approximate (caused by a repeated texture), it may be considered with great certainty that the search region currently has the repeated texture, and belongs to a repeated texture region.

513. Determine the texture property is a normal region.

As disclosed in the embodiments of the present invention, after the division of the texture-less region and the repeated texture region is completed, remaining cases may be directly classified as a normal region.

To improve the reliability of a division result or a stereo matching result and avoid misjudgment, as shown in FIG. 5, in some other embodiments, before step 509 is performed, additional determining standard may be further set, to determine whether the low-cost pixels in the low aggregation cost interval in which the aggregate cost values are located are unique (510), and it is determined to be a normal region only when the low-cost pixels are unique.

In this embodiment, such an additional determining standard may match a widely used winner-takes-all (WTA) principle in a stereo matching algorithm.

The "winner-takes-all principle" refers to a policy of directly taking a reference pixel with a lowest value as a corresponding point of a target pixel after aggregate cost values corresponding to all reference pixels in a search region are calculated. It may be understood that, such a policy relies heavily on the accuracy of calculating the aggregate cost values, which is prone to misjudgment when there are a plurality of close aggregate cost values that may be selected.

Therefore, when the low-cost pixels are unique, and there are no excessively close candidate reference pixels, there is relatively large certainty for the "winner-takes-all principle" to obtain an accurate optimal solution (that is, to select a suitable reference pixel).

To improve the robustness of the stereo matching method under the guidance of the "winner-takes-all" principle, the embodiments of the present invention further provide a method for calculating disparity values corresponding to texture properties such as a texture-less region, a repeated texture region and a normal region.

Referring to FIG. 5 still, after the texture-less region is determined, the method further includes the following steps:

508. Set the disparity value at the position of the target pixel to an invalid value.

Because the computer vision cannot effectively distinguish or identify a difference between pixels in the texture-less region, it is basically impossible to obtain a satisfactory result (not much different from random selection) even if stereo matching continues to be performed.

Therefore, the disparity value may be directly set to an invalid value, to better avoid the interference of the pixels with the stereo matching and improve the robustness of the stereo matching algorithm.

After it is determined to be the repeated texture region, the corresponding method for calculating the disparity value includes:

512. Update a size of the search region according to a distribution width of the low-cost pixels.

The distribution width refers to a farthest distance between positions of the low-cost pixels in the reference image. Updating refers to adjusting a size of the search region according to a distribution shape of the low-cost pixels, and narrowing the size to a suitable size to better find matching points.

In some embodiments, for the reference image and the target image that have been in epipolar alignment, a progressive scanning method may be used between the two. Therefore, the search region is displayed as a specific row in the reference image. Correspondingly, when the search region is updated, a distance between a low-cost pixel at a maximum horizontal coordinate and a low-cost pixel at a minimum horizontal coordinate may be directly calculated, provided that the updated search region is determined as a search region.

514. Recalculate aggregate cost values between all reference pixels and a target pixel in the updated search region.

After the search region is delimited again, step 501 is performed to calculate aggregate cost values. By narrowing the search region, the statistical significance of the low-cost pixels can be improved.

A person skilled in the art may understand that, as shown in FIG. 8, when an original search region 8C is excessively large, and occupies two or more similar textures, the stereo matching is influenced. After the search region is reduced or narrowed, a probability of a repeated texture in the search region is greatly reduced, thereby improving the accuracy of the stereo matching.

After it is determined that the reference image in the search region belongs to the normal texture region, the disparity value may be calculated in the following manner:

516. Determine that a reference pixel with a lowest aggregate cost value is a corresponding pixel of the target pixel in the reference image.

As recorded above, the "winner-takes-all principle" is used to select an optimal reference pixel in this embodiment. That is, it is considered that the corresponding pixel and the target pixel are projections of a same point in a spatial object in the reference image and the target image respectively.

518. Calculate a distance between the corresponding pixel and the target pixel as the disparity value.

"Distance" is a change degree between two corresponding pixels in different images. As a general definition, according to a requirement of an actual situation or a difference between application scenarios, the distance may be specifically represented by using any type of similarity measure.

Specifically, position coordinates of the corresponding pixel and the target pixel may be simply subtracted to obtain a corresponding disparity value. For example, when the corresponding pixel is $(x_1, y_0)$, and the target pixel is $(x_0, y_0)$, the disparity value is equal to $x_1-x_0$.

In this embodiment, in step 518, the calculated disparity map may further be further optimized according to a requirement of an actual situation, to improve the quality of the final obtained disparity map, including eliminating a wrong disparity, appropriate smoothing and subpixel refinement.

For example, a wrong disparity caused by occlusion and noise may be eliminated by using a left-right check algorithm, an isolated abnormal point may be eliminated by using a small connected region algorithm, and a disparity map may be smoothed by using a smoothing algorithm such as a median filter or bilateral filter algorithm.

In some other embodiments, the quality of the disparity map may be further improved through robust plane fitting, intensity consistent, locally consistent or the like.

The following uses subpixel refinement as an example to describe the process of optimizing the disparity value in detail. As shown in step 518, the disparity value calculated according to the distance between two pixels is of integer pixel precision, which may not well meet use requirements of some scenarios.

Figure 7:
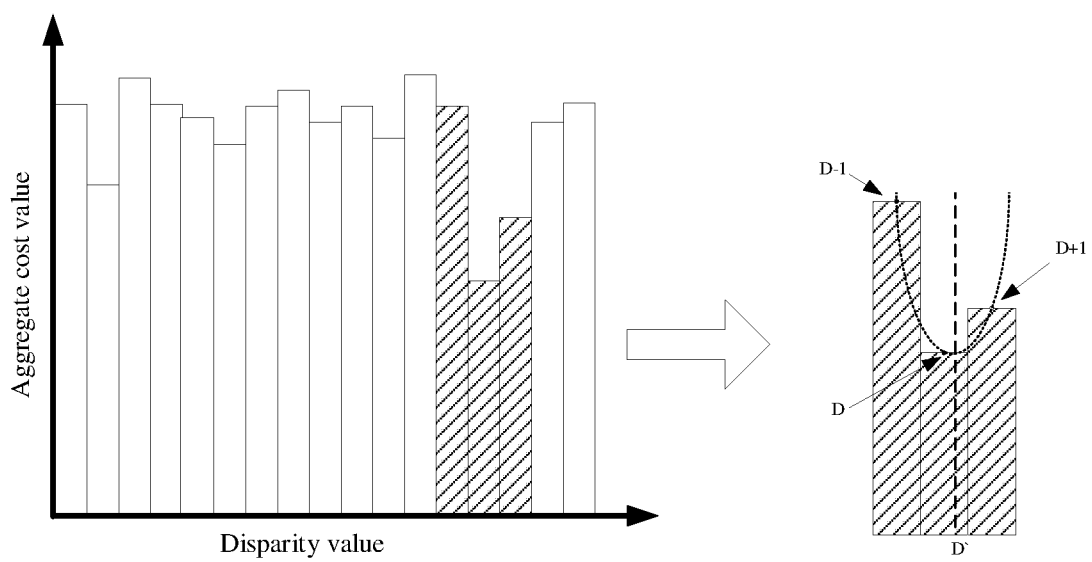
FIG. 7 is a schematic diagram of a method for optimizing a subpixel according to an embodiment of the present invention.

To obtain higher subpixel accuracy, an optimization manner of quadratic curve fitting may be used. FIG. 7 is a schematic diagram of reference pixels and corresponding aggregate cost values in a search region according to an embodiment of the present invention.

As shown in FIG. 7, a horizontal coordinate is a disparity value between the reference pixel and a target pixel, and a vertical coordinate is an aggregate cost value corresponding to the reference pixel. First, three points, namely, an optimal pixel D and two reference pixels (D−1, D+1) adjacent to the optimal pixel in the reference image are determined.

Then, a quadratic curve is fitted according to the three points. When a minimum point of the quadratic curve is located between (D−1, D+1), a horizontal coordinate corresponding to the minimum point is used as a refined disparity value, to finally obtain a disparity value D' of subpixel precision.

That is, an aggregate cost value of the optimal pixel and aggregate cost values of two reference pixels adjacent to the optimal pixel in the reference image are used to fit a quadratic curve; and a horizontal coordinate corresponding to a minimum point of the quadratic curve obtained through fitting is then used as a disparity value.

It should be noted that, to fully describe the method for calculating the disparity in this embodiment of the present invention, both the distinction between three texture properties and the corresponding method for calculating the disparity value are placed in a same accompanying drawing for description. However, a person skilled in the art may understand that, the foregoing three texture properties and the corresponding method for calculating the disparity value are not necessarily used simultaneously in combination in one technical solution. The classification standards of the texture-less region, the repeated texture region or the normal region formed through division are independent of each other, and may be respectively used in a same technical solution or different technical solutions without being used simultaneously.

In summary, in the stereo matching method provided in the embodiments of the present invention, advanced information is mined from a search region, and calculation of a disparity value is adjusted accordingly with reference to a distribution of aggregate cost values, which helps improve the robustness and accuracy of the stereo matching method, so that the functions of path planning or obstacle warning of a unmanned mobile vehicle that relies on the stereo vision technology have better performance and property.

A person skilled in the art may further realize that, steps in the exemplary stereo matching method described in the embodiments disclosed in this specification may be implemented by using electronic hardware, computer software, or a combination thereof. To clearly describe interchangeability between the hardware and the software, compositions and steps of each example have been generally described according to functions in the foregoing descriptions. Whether the functions are executed in a manner of hardware or software depends on particular applications and design constraint conditions of the technical solutions.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above. These changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and these modifications or replacements will not cause the essence of corresponding technical solutions to depart from the scope of the technical solutions in the embodiments of the present invention.

What is claimed is:

1. A stereo matching method, comprising:
    calculating aggregate cost values between all reference pixels and a target pixel in a preset search region, the reference pixel being a pixel in a reference image, and the target pixel being a pixel in a target image;
    determining a texture property of the reference image in the search region according to a distribution of the aggregate cost values; and
    obtaining a disparity value between the reference image and the target image at a position of the target pixel by using a method for calculating a disparity value corresponding to the texture property, wherein the texture property comprises: a normal region, a repeated texture region and a texture-less region,
    wherein the determining a texture property of the reference image in the search region according to a distribution of the aggregate cost values comprises:
    counting low-cost pixels in a low aggregation cost interval in which the aggregate cost values are located, the low aggregation cost interval being defined by a lowest value among the aggregate cost values;
    calculating a proportion of the low-cost pixels in the reference pixels in the search region; and
    determining that the texture property is the texture-less region, when the proportion is greater than a preset proportion threshold.

2. The stereo matching method according to claim 1, wherein when the texture property is the texture-less region, the using a method for calculating a disparity value corresponding to the texture property, to obtain a disparity value between the reference image and the target image at a position of the target pixel comprises:
    setting the disparity value at the position of the target pixel to an invalid value.

3. The stereo matching method according to claim 1, wherein a lower limit of the low aggregation cost interval is the lowest value among the aggregate cost values, and an upper limit of the low aggregation cost interval is 1.5 times of the lowest value among the aggregate cost values.

4. The stereo matching method according to claim 1, wherein the determining a texture property of the reference image in the search region according to a distribution of the aggregate cost values comprises:
    determining whether low-cost pixels in a low aggregation cost interval in which the aggregate cost values are located are unique, the low aggregation cost interval being defined by a lowest value among the aggregate cost values; and
    determining the texture property is the normal region if yes.

5. The stereo matching method according to claim 4, wherein when the texture property is the normal region, the using a method for calculating a disparity value corresponding to the texture property, to obtain a disparity value between the reference image and the target image at a position of the target pixel comprises:
    determining that a reference pixel with a lowest aggregate cost value is a corresponding pixel of the target pixel in the reference image; and
    using a distance between the corresponding pixel and the target pixel as the disparity value.

6. The stereo matching method according to claim 1, wherein the determining a texture property of the reference image in the search region according to a distribution of the aggregate cost values of the pixels comprises:
    counting low-cost pixels in a low aggregation cost interval in which the aggregate cost values are located, the low aggregation cost interval being defined by a lowest value among the aggregate cost values;
    calculating a proportion of the low-cost pixels in the reference pixels in the search region; and
    determining that the texture property is a repeated texture region, when the proportion is less than a preset proportion threshold and a quantity of the low-cost pixels is greater than a preset quantity threshold.

7. The stereo matching method according to claim 6, wherein when the texture property is the repeated texture region, the using a method for calculating a disparity value corresponding to the texture property, to obtain a disparity value between the reference image and the target image at a position of the target pixel comprises:
    updating a size of the search region according to a distribution width of the low-cost pixels; and
    recalculating aggregate cost values between all reference pixels and a target pixel in the updated search region.

8. The stereo matching method according to claim 7, wherein the updating a size of the search region according to a distribution width of the low-cost pixels comprises:
    in the reference image, calculating a distance between a low-cost pixel at a maximum horizontal coordinate and a low-cost pixel at a minimum horizontal coordinate; and
    using the distance as a length of the updated search region.

9. The stereo matching method according to claim 1, wherein when the texture property is a normal region, the method further comprises:
    performing, by quadratic curve fitting, subpixel refinement on the disparity value at the position of the target pixel.

10. The stereo matching method according to claim 9, wherein the performing, by quadratic curve fitting, subpixel refinement on the disparity value at the position of the target pixel comprises:
    determining a reference pixel with a lowest aggregate cost value as an optimal pixel;
    using an aggregate cost value of the optimal pixel and aggregate cost values of two reference pixels adjacent to the optimal pixel in the reference image to fit a quadratic curve; and
    using a horizontal coordinate corresponding to a minimum point of the quadratic curve obtained through fitting as a refined disparity value.

11. The stereo matching method according to claim 1, wherein the calculating aggregate cost values between all reference pixels and a target pixel in a preset search region comprises:
    performing grayscale value sampling in the target image by using a first sampling window with a preset side length, to obtain a first sampling result, a center of the first sampling window being the target pixel;

performing grayscale value sampling in the reference image by using a second sampling window with the same size as the first sampling window, to obtain a second sampling result, a center of the second sampling window being the reference pixel;

calculating a difference between grayscale values of the first sampling result and the second sampling result at corresponding positions; and superposing differences between all the grayscale values, to obtain an aggregate cost value of the reference pixels.

12. The stereo matching method according to claim 11, wherein the target image is in epipolar alignment with the reference image, and the preset search region is a region between a search lower limit pixel and a search upper limit pixel;

two-dimensional coordinates of the search lower limit pixel in the reference image are (x0+k1, y0), and two-dimensional coordinates of the search upper limit pixel in the reference image are (x0+k2, y0); and two-dimensional coordinates of the target pixel in the target image are (x0, y0), and k1 and k2 are constant values greater than 0.

13. An image processing chip, comprising:

at least one processor;

and a memory, communicatively connected to the at least one processor, the memory storing computer-executable program instructions, the computer-executable program instructions, when invoked, causing the at least one processor to perform:

calculating aggregate cost values between all reference pixels and a target pixel in a preset search region, the reference pixel being a pixel in a reference image, and the target pixel being a pixel in a target image;

determining a texture property of the reference image in the search region according to a distribution of the aggregate cost values;

obtaining a disparity value between the reference image and the target image at a position of the target pixel by using a method for calculating a disparity value corresponding to the texture property; and obtaining a disparity space image according to the disparity value, wherein the texture property comprises: a normal region, a repeated texture region and a texture-less region, wherein the determining a texture property of the reference image in the search region according to a distribution of the aggregate cost values comprises:

counting low-cost pixels in a low aggregation cost interval in which the aggregate cost values are located, the low aggregation cost interval being defined by a lowest value among the aggregate cost values;

calculating a proportion of the low-cost pixels in the reference pixels in the search region; and determining that the texture property is the texture-less region, when the proportion is greater than a preset proportion threshold.

14. A mobile vehicle, comprising:

at least a pair of cameras, configured to capture first image information and second image information respectively; and an image processing chip, configured to: receive the first image information and the second image information, the image processing chip comprising at least one processor;

and a memory, communicatively connected to the at least one processor, the memory storing computer-executable program instructions, the computer-executable program instructions, when invoked, causing the at least one processor to perform:

calculating aggregate cost values between all reference pixels and a target pixel in a preset search region, the reference pixel being a pixel in a reference image, and the target pixel being a pixel in a target image;

determining a texture property of the reference image in the search region according to a distribution of the aggregate cost values;

obtaining a disparity value between the reference image and the target image at a position of the target pixel by using a method for calculating a disparity value corresponding to the texture property; and obtaining a disparity space image according to the disparity value; and converting the disparity space image into corresponding depth information according to internal parameters and external parameters of the cameras, wherein the texture property comprises: a normal region, a repeated texture region and a texture-less region, wherein the determining a texture property of the reference image in the search region according to a distribution of the aggregate cost values comprises:

counting low-cost pixels in a low aggregation cost interval in which the aggregate cost values are located, the low aggregation cost interval being defined by a lowest value among the aggregate cost values;

calculating a proportion of the low-cost pixels in the reference pixels in the search region; and determining that the texture property is the texture-less region, when the proportion is greater than a preset proportion threshold.

15. The mobile vehicle according to claim 14, wherein optical axes of the pair of cameras are parallel, and the first image information and the second image information that are captured are image information with epipolar alignment.

* * * * *